(No Model.)

M. MARSHFIELD.
PROCESS OF PRESERVING FRUIT.

No. 467,641. Patented Jan. 26, 1892.

Witnesses:
Samuel B. Kimball
H. Warren

Inventor:
Maggie Marshfield
by Robt. S. Iles,
her
Attorney.

UNITED STATES PATENT OFFICE.

MAGGIE MARSHFIELD, OF CHICAGO, ILLINOIS.

PROCESS OF PRESERVING FRUIT.

SPECIFICATION forming part of Letters Patent No. 467,641, dated January 26, 1892.

Application filed October 25, 1890. Serial No. 369,284. (No specimens.)

*To all whom it may concern:*

Be it known that I, MAGGIE MARSHFIELD, a citizen of the United States, residing in Chicago, in Cook county and State of Illinois, have invented a certain new and useful Process of Preserving Fruit; and I do declare the following to be a full, clear, and exact description of the invention, such as will enable others skilled in the art to which it appertains to make and use the same.

This invention relates to the process of cooking and preserving fruit, and has for its object to better retain the natural flavor of the fruit in the process of preserving the same.

In preserving fruits, especially small fruits—such as berries, &c.—it is desirable, in order to preserve the natural flavor, to prevent the fruit being broken up or disintegrated in cooking, and for this reason it is desirable that the fruit should be stirred or handled as little as possible during the cooking process. In carrying out my invention these ends are arrived at by cooking the fruit and the preserving-sirup separately and simultaneously and in cooking the fruit by steaming only, while allowing the drippings from the fruit to run into the sirup, and, finally, uniting the fruit and sirup when both are hot. As a further step, when it is desired to add artificial flavoring to the fruit, the flavoring is introduced into the sirup during the cooking process.

In carrying out my invention I have produced the best results by the use of the apparatus shown in the accompanying drawings, which apparatus is so arranged as to support the fruit over a vessel containing the sirup, so that the fruit is cooked by the steam from the sirup, and the juices or drippings from the fruit are allowed to fall into and become admixed with the sirup.

Figure 1:
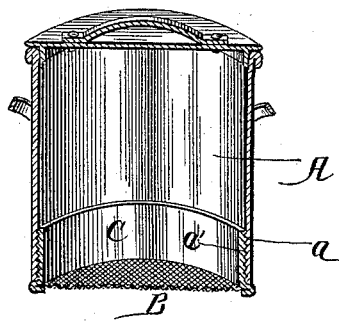
Figure 2:
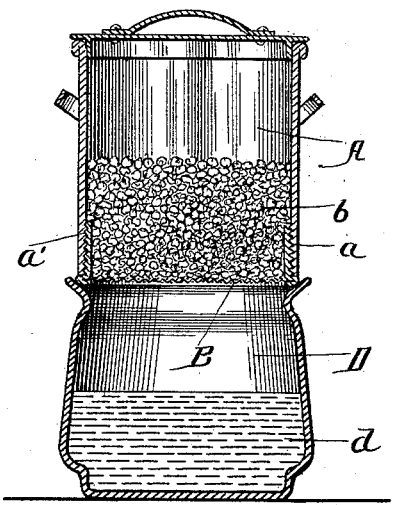

In said drawings, Figure 1 is a sectional perspective view of the "steamer" or receptacle for the fruit to be cooked. Fig. 2 is a view in central vertical section of the cooking apparatus as a whole, showing the steamer resting upon a vessel for holding the sirup and generating steam.

As shown in said drawings, A indicates the steamer as a whole. Said steamer may be made of sheet metal or otherwise, and is preferably cylindrical in form and provided with suitable handles and a lid. B indicates a reticulated perforated bottom for the steamer, which may be made of woven wire, as shown, or otherwise. In the particular construction shown the bottom B is secured at its margin to a collar or ring C, which is provided with external screw-threads $a'$, fitting similar internal screw-threads $a$ on the cylindric body of the steamer A. D indicates a vessel, which is used in this apparatus both for cooking the sirup and generating steam, said vessel D being adapted to support the steamer A on its upper edge or rim. The parts of the vessel and steamer which are in contact are made to fit each other with reasonable accuracy so as to prevent any considerable escape of steam at the joints between the vessels. The fruit within the steamer and resting upon the perforated bottom thereof is indicated by $b$, while the sirup in the vessel D is indicated at $d$.

The bottom of the steamer A is preferably made detachable, as shown, in order that perforated wire bottoms having openings or meshes of different sizes may be employed for convenience in cooking different kinds of fruit.

In the use of the apparatus above described in carrying out my novel process I proceed as follows: Fruit and sugar in the proper proportions, according to the acidity and quality of the fruit, are placed, respectively, in the steamer A and vessel D, sufficient water being added to the sugar in vessel D to make a sirup. If flavoring is desired, the required flavoring extract is added to the sugar. The steamer A is then covered and placed upon the vessel D, as shown in Fig. 2, and the vessel D is then exposed to heat for such a length of time as is required for the cooking of the fruit by the steam arising from the sirup. Care is taken not to boil the sirup too fast, and water is added from time to time if the sirup becomes too thick. When the fruit is properly cooked, it is transferred from the steamer into the sirup in the vessel D, and the latter is then preferably removed from the fire, when the admixture will be ready to be put into jars.

Fruit preserved in the manner described is found to retain in a great degree its natural form and flavor, and the preserves are of superior and delicious quality.

In cases where it is not desired to retain the fruit in its natural form—as, for instance, in making jams and jellies—the same apparatus may be used in carrying out my process, and the fruit in such cases may be conveniently broken up and mixed with the sirup after it is cooked by pressing it through the perforated bottom of the steamer, which bottom may have meshes of greater or less fineness for jelly or jam or for fruit of different kinds.

While I have shown the apparatus above described as one well adapted for carrying out my invention, yet it is of course to be understood that the cooking of the fruit by steaming, while allowing the juices or drippings from the fruit to pass or flow into the sirup with which the fruit is to be mixed, may be accomplished by the use of apparatus or utensils differing materially from the devices herein illustrated.

Having described my invention, what I claim as new, and desire to secure by Letters Patent, is—

1. The process of preserving fruit, consisting in steaming the fruit over sirup, so that the drippings from the fruit will fall into the sirup during the cooking process, and when the fruit is cooked and the sirup evaporated to the proper consistency adding the fruit to the sirup while both are hot.

2. The process of preserving and flavoring fruit, consisting in steaming the fruit over sirup containing flavoring extract and allowing the drippings from the fruit to fall into the sirup, and when the fruit is thoroughly cooked and the sirup evaporated to the proper consistency adding the fruit to the sirup while both are hot.

MAGGIE MARSHFIELD.

Witnesses:
   THEO. A. SITTIG,
   C. C. BOWERSOCK.